US006442511B1

(12) United States Patent
Sarangapani et al.

(10) Patent No.: US 6,442,511 B1
(45) Date of Patent: Aug. 27, 2002

(54) METHOD AND APPARATUS FOR DETERMINING THE SEVERITY OF A TREND TOWARD AN IMPENDING MACHINE FAILURE AND RESPONDING TO THE SAME

(75) Inventors: Jagannathan Sarangapani, San Antonio, TX (US); Sri K. Rangarajan, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/390,063

(22) Filed: Sep. 3, 1999

(51) Int. Cl.[7] .............................................. H04B 15/00
(52) U.S. Cl. .................... 702/194; 73/660; 340/870.01; 700/45; 700/174; 702/179; 702/183; 702/185
(58) Field of Search .............................. 702/34, 81, 82, 702/181, 183, 185, 187; 340/501; 701/114

(56) References Cited

U.S. PATENT DOCUMENTS

| 3,882,305 A | | 5/1975 | Johnstone .................... 702/183 |
|---|---|---|---|
| RE31,750 E | | 11/1984 | Morrow ........................ 702/34 |
| 4,583,176 A | | 4/1986 | Yamato et al. ............... 701/114 |
| 4,787,053 A | | 11/1988 | Moore .......................... 701/123 |
| 4,825,195 A | | 4/1989 | Berruyer ....................... 340/501 |
| 4,937,763 A | | 6/1990 | Mott .............................. 702/183 |
| 4,967,381 A | | 10/1990 | Lane et al. ..................... 702/81 |
| 5,293,323 A | * | 3/1994 | Doskocil et al. ............. 702/185 |
| 5,414,632 A | * | 5/1995 | Mochizuki ................... 700/174 |
| 5,453,939 A | * | 9/1995 | Hoffman et al. ............. 702/183 |
| 5,463,567 A | | 10/1995 | Boen et al. ................... 702/187 |
| 5,481,481 A | | 1/1996 | Frey et al. ...................... 702/82 |
| 5,486,997 A | * | 1/1996 | Reismiller et al. ............. 700/45 |
| 5,561,610 A | | 10/1996 | Schricker et al. ............ 702/185 |
| 5,566,091 A | | 10/1996 | Schricker et al. .............. 702/34 |
| 5,602,761 A | * | 2/1997 | Spoerre et al. ............... 702/179 |
| 5,610,339 A | * | 3/1997 | Haseley et al. ................ 73/660 |
| 5,710,723 A | | 1/1998 | Hoth et al. ................... 702/181 |
| 5,715,178 A | | 2/1998 | Scarola et al. ............... 702/116 |
| 5,808,557 A | * | 9/1998 | Berge et al. ........... 340/870.01 |
| 5,950,147 A | * | 9/1999 | Sarangapani et al. ........ 702/179 |
| 6,119,074 A | * | 9/2000 | Sarangapani et al. ........ 702/185 |

* cited by examiner

Primary Examiner—John S. Hilten
Assistant Examiner—John Le
(74) Attorney, Agent, or Firm—Blackwell Sanders Peper Martin LLP

(57) ABSTRACT

A method and apparatus for determining severity of a trend toward an impending machine failure under actual operating conditions. The method and apparatus includes providing a typical failure trend based on a set of normal operating conditions for the machine, determining a slope value for the typical failure trend, determining a slope value for the trend toward the impending machine failure under the actual or proposed operating conditions, determining a weight value for at least the actual or proposed operating conditions, and determining the severity as a function of the slope values and the weight value.

12 Claims, 6 Drawing Sheets

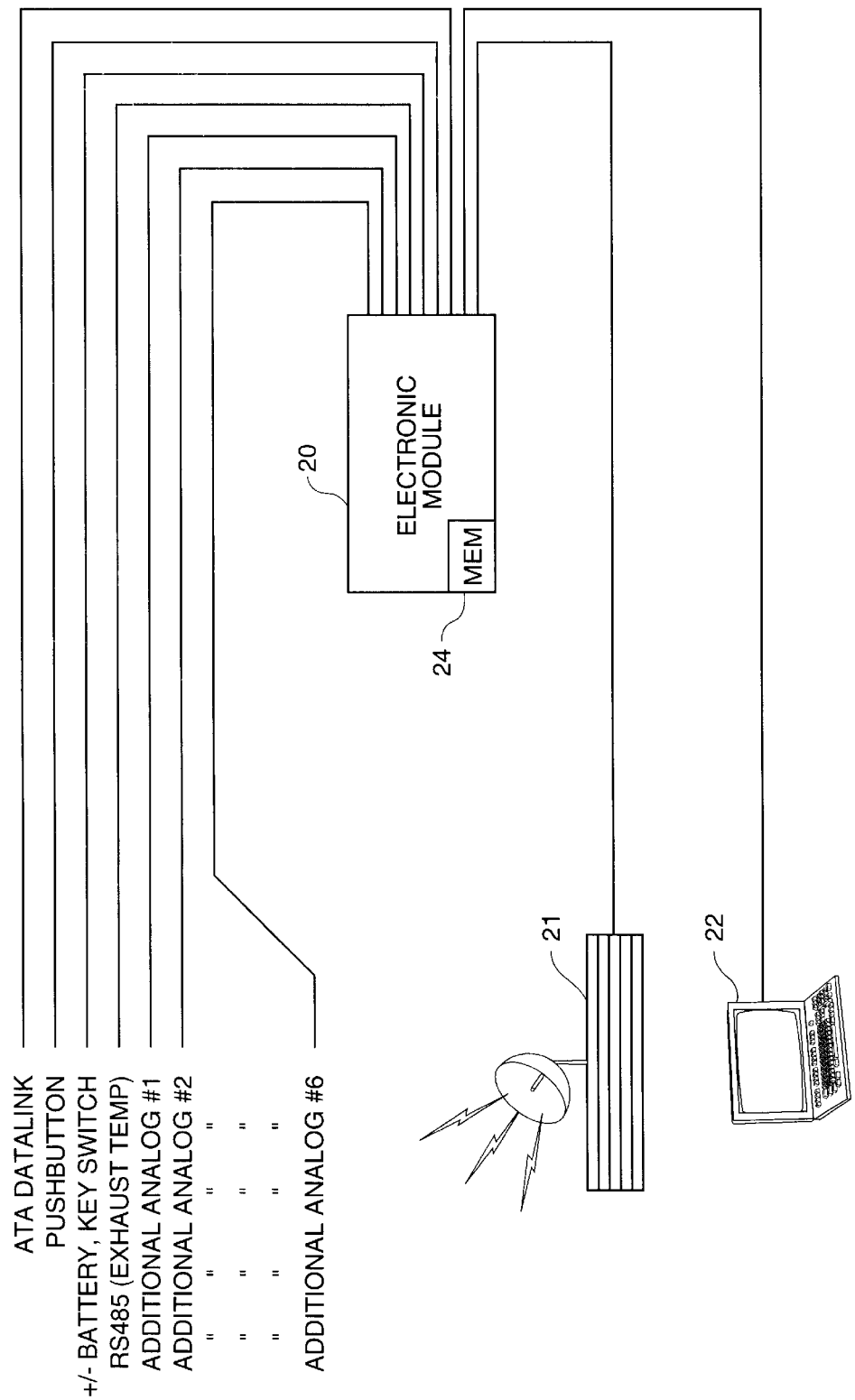

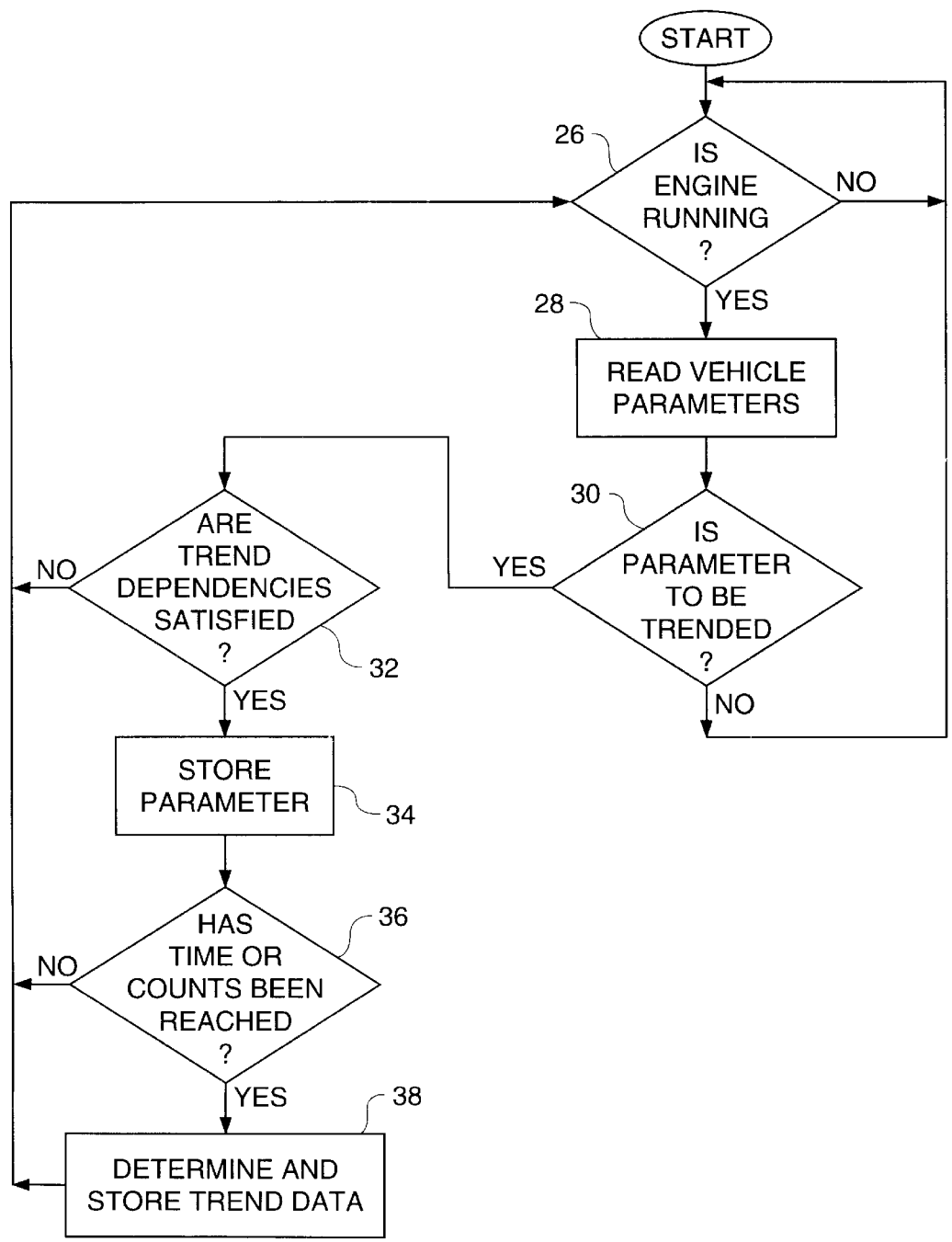

Fig_4_
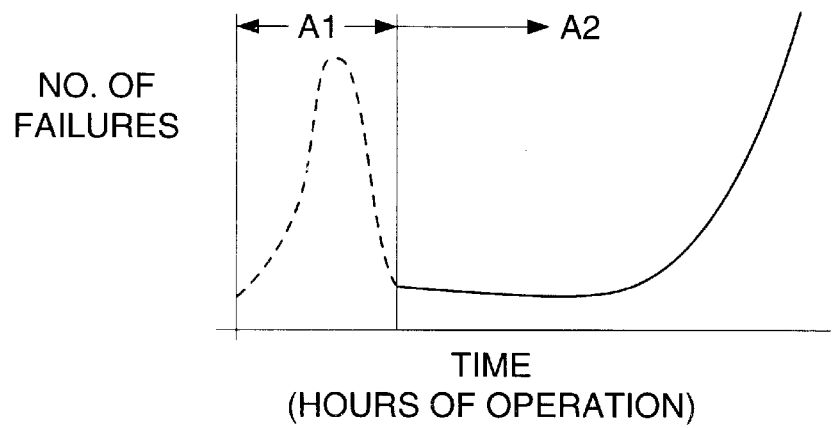
Fig_5_
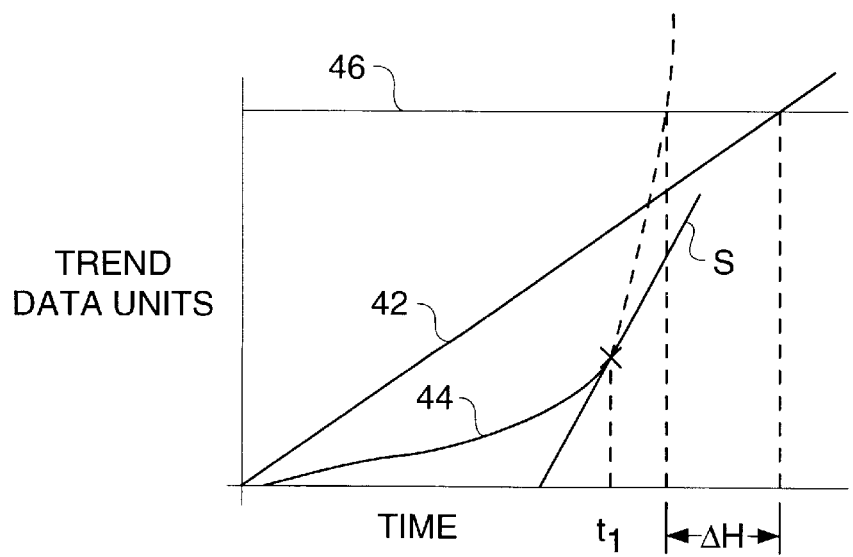

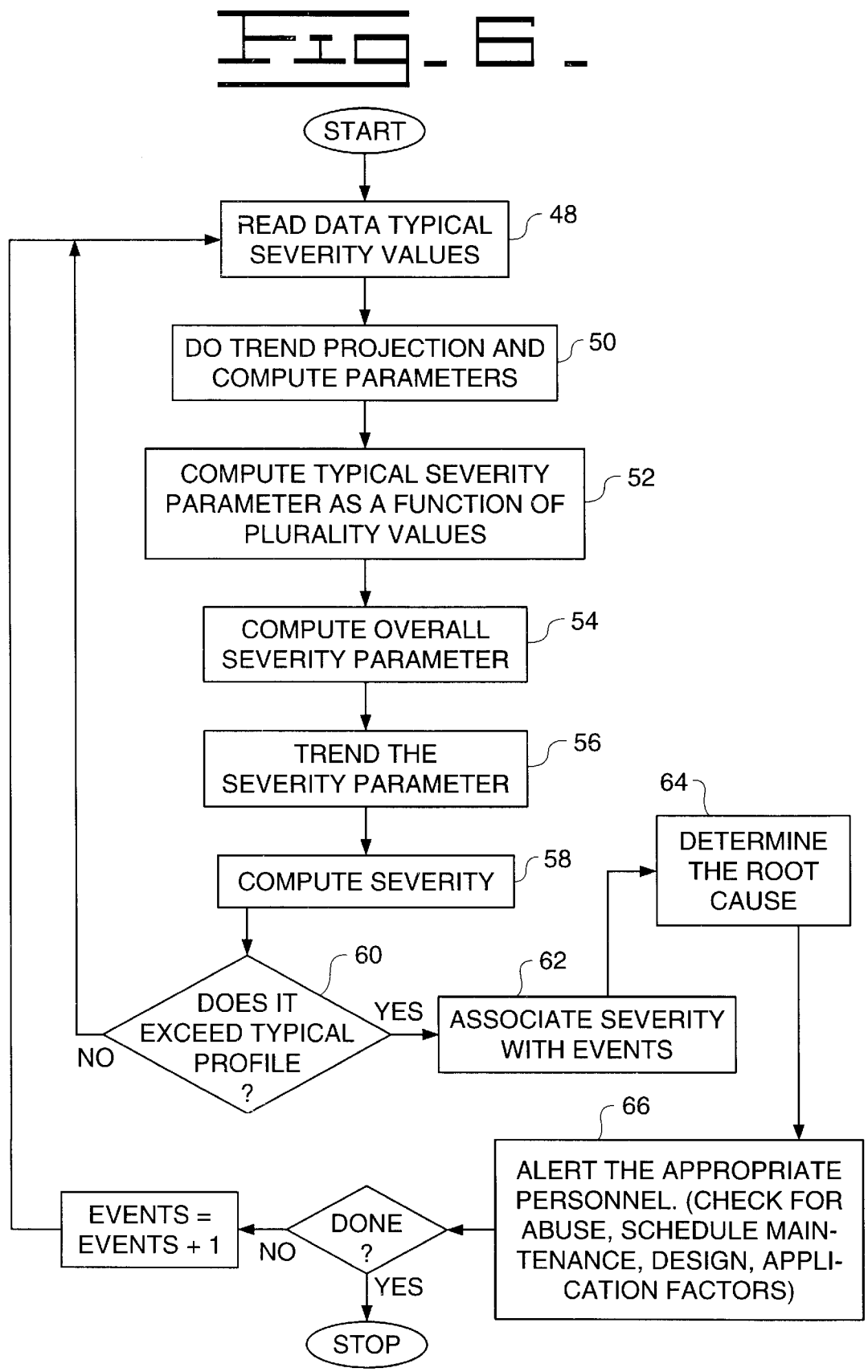
Fig_6_

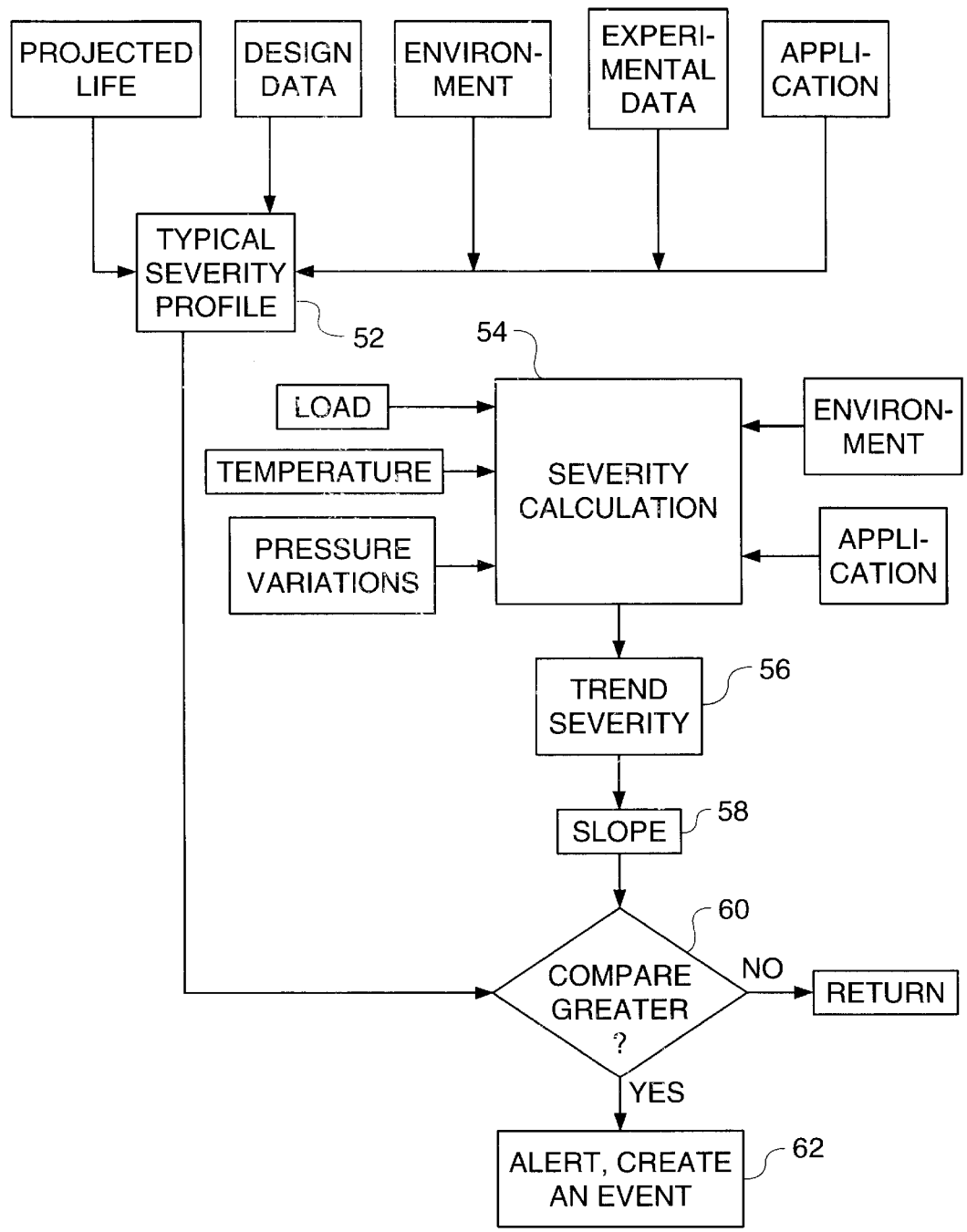

METHOD AND APPARATUS FOR DETERMINING THE SEVERITY OF A TREND TOWARD AN IMPENDING MACHINE FAILURE AND RESPONDING TO THE SAME

TECHNICAL FIELD

This invention relates generally to evaluating a machine parameter trend as it approaches an impending failure limit or point of unacceptable performance and reacting thereto, and more particularly, to a method and apparatus for determining a severity value for the trend, identifying the causal event or events thereof, and responding to the same.

BACKGROUND ART

For service and diagnostic purposes, machines are sometimes equipped with sensors for measuring operating conditions such as engine RPM, oil pressure, water temperature, boost pressure, oil contamination, electric motor current, hydraulic pressure, system voltage, and other like parameters. In some cases, storage devices are provided to compile a data base for later evaluation of machine performance and to aid in diagnosis. Service personnel examine the accrued data to get a better picture of the causes of any machine performance degradation, wear or failure. Similarly, service personnel evaluate the stored data to predict future failures and associated collateral damages, and to correct any problems before total component failure.

In addition, these stored parameters may be examined by service or supervisory personnel to evaluate machine and/or operator performance to ensure maximum productivity of the machine. These issues are particularly pertinent to over-the-highway trucks and large work machines such as off-highway mining trucks, hydraulic excavators, track-type tractors, wheel loaders, and the like. These machines represent large capital investments and are capable of substantial productivity when operating. It is therefore important to predict significant performance loss, wear and catastrophic failures so servicing can be scheduled during periods in which productivity will be less affected, so that the machine can be moved to a lighter duty, or so minor problems can be repaired before they lead to catastrophic failures.

Similarly, it is sometimes advantageous to accumulate parameters only when the machine is in a particular operating condition. This type of information is predominantly used during performance evaluation but may also be used in failure diagnosis and prognosis. For example, the length of time spent in a particular gear while the machine is loaded may be needed to evaluate machine performance.

Currently, numerous methods and apparatus are known for determining machine operating parameter trends for predicting and diagnosing machine fault conditions.

Reference, for instance, Schricker et al. U.S. Pat. No. 5,561,610, issued Oct. 1, 1996 to Caterpillar, Inc. which discloses linear curve fitting techniques for identifying trends for predicting fault conditions. Also reference Kondo et al. European Patent Application No. 81303100.2 published Jan. 13, 1982, assigned to Nippondenso Co., Ltd., which discloses methods and an apparatus for forecasting and giving warning of automotive abnormalities characterized by calculating a rate of change of a detection signal, forecasting the occurrence of an abnormality based on the rate of change, and responsively issuing an alarm.

However, the referenced known methods and apparatus fail to identify the root cause or causes for increases in the severity of failure trends or abnormalities, to enable responding to the same.

For instance, with information relating to the cause of an increase in severity of a trend toward an impending machine failure, service personnel would be able to take steps to eliminate or reduce the cause so as to decrease the severity and thus prolong the remaining service life of the machine. Also, using information regarding causation of a severity increase, machine manufacturers and dealers would be able to more accurately determine warranty costs and limitations for service contracts and the like. Such information would also enable better planning of maintenance schedules and machine downtime for service and repair.

Accordingly, the present invention is directed to overcoming one or more of the problems as set forth above.

DISCLOSURE OF THE INVENTION

In one aspect of the present invention a method for determining severity of a trend toward an impending machine failure under actual or proposed operating conditions is disclosed, including the steps of:

(a) providing a typical failure trend based on a set of normal operating conditions for the machine;

(b) determining a slope value for the typical failure trend;

(c) determining a slope value for the trend toward the impending machine failure under the actual or proposed operating conditions;

(d) determining a weight value for at least the actual or proposed operating conditions; and (e) determining the severity as a function of the slope values and the weight value. According to an additional aspect of the invention apparatus for performing the above method is also disclosed.

According to the invention, the weight value for the actual or proposed operating conditions can be determined from load data, temperature data, pressure variation data, environmental data, application data, as well as other pertinent information. Additionally, a weight value can be determined for the typical failure trend and the severity determined as a function of the slopes and the weight values for both the normal operating conditions and the actual or proposed operating conditions.

The severity can then be compared to a predetermined typical severity profile value, and, if greater than the typical profile, a problem is identified and the severity can be associated with the current events or conditions to determine a root cause for the severity. For instance, if the severity determination relates to oil temperature, sensor data would be reviewed or a physical check of the machine could be made to determine if related events or conditions are present. For instance, a determination could be made whether the cooling fan was operational or a coolant line or a radiator was clogged. Appropriate personnel could then be alerted or other action taken, such as corrective action or some step to alleviate the condition such as moving the machine to an easier job or removing an abusive operator.

The present invention also has utility for failure diagnosis and prognosis, and can be used for more accurately determining warranty cost and limitations for applications involving unusual operating conditions.

BRIEF DESCRIPTION OF THE DRAWINGS

For a better understanding of the present inventions reference may be made to the accompanying drawings in which;

FIG. 2 illustrates a plurality of machine parameter connections to an electronic module of the machine prognostic system;

FIG. 3 illustrates a method performed by the electronic module to trend machine parameters;

FIG. 4 illustrate an example group of data points collected showing machine failures attributed to manufacturing defects and failures attributed to operation verses time;

FIG. 5 illustrates examples of curves showing a typical trend and an actual trend of a machine parameter to a threshold level representative of a failure limit or unacceptable performance limit;

FIG. 6 illustrates steps for determining the severity of a trend toward a failure limit or point of unacceptable performance for a machine parameter; and FIG. 7 illustrates additional steps for determining severity.

BEST MODE FOR CARRYING OUT THE INVENTION

Figure 1:
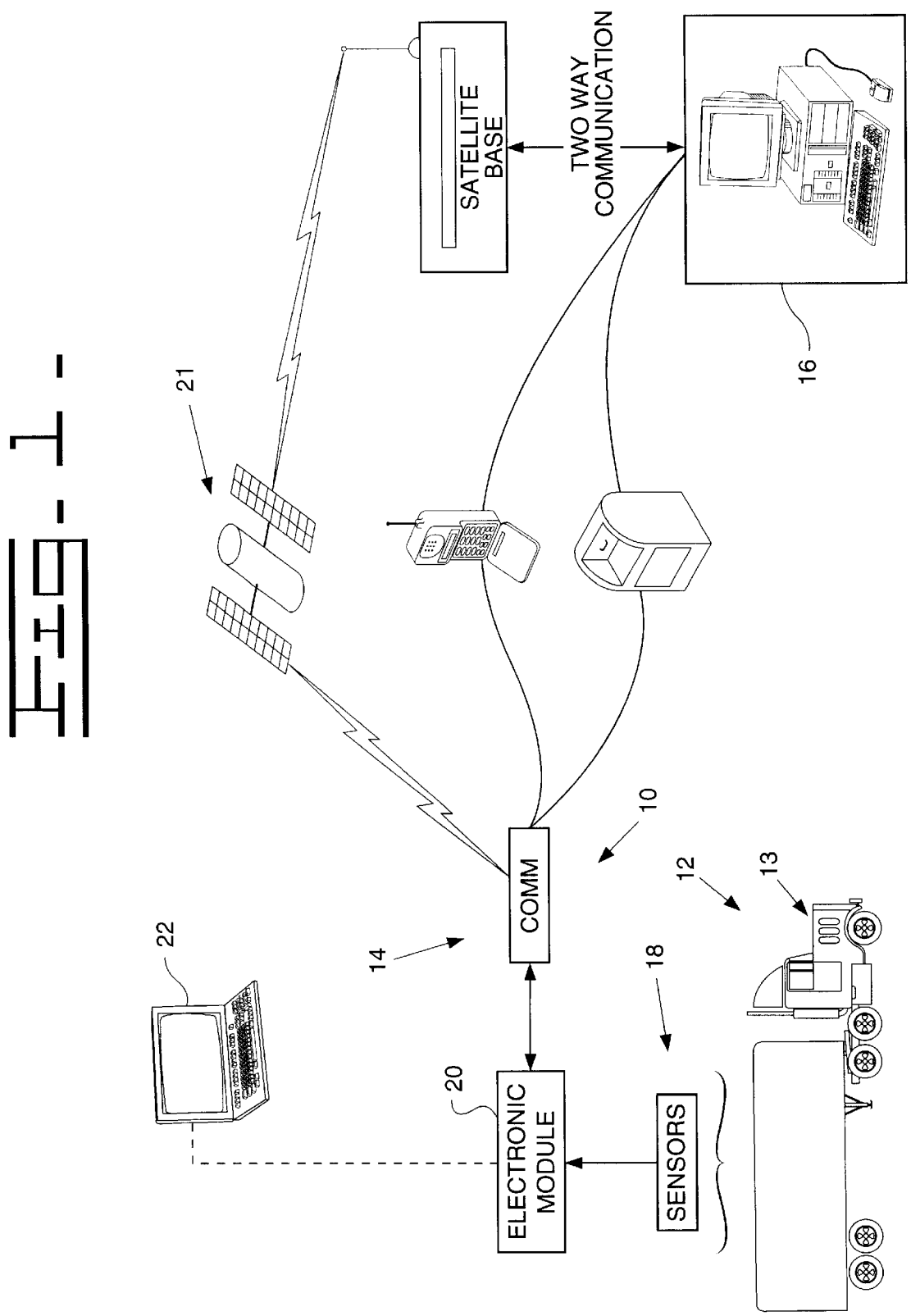
FIG. 1 is a high level diagrammatic illustration of a machine prognostic system.

Referring to FIG. 1, a machine prognostic system is shown generally by the number 10 and is a data acquisition, analysis, storage and display system for a work machine 12. In the preferred embodiment, an engine 13 powers work machine 12. Employing a complement of on-board and off-board hardware and software, the machine prognostic system 10 monitors and derives machine component information and analyzes the resulting data to indicate and/or predict impending component or system failures or unacceptable performance levels.

FIG. 1 illustrates a variety of potential communication systems 14 that may be used to transfer data from the work machine 12 to a central computer system 16 for analysis. For example, the data may be transferred by a satellite system back to the central computer system 16. Alternatively, the data may be transferred by a cellular telephone system or by storing data on a computer disk which is then mailed to the central computer site for analysis.

It should be understood that all aspects of the present invention could be located on-board the work machine 12 thereby eliminating the need for a communication system 14; however, the central computer system 16 allows an entire fleet to be monitored at a central location.

Subsets of the data are also transmitted to a display module (not shown) in the operator compartment in the form of gauges and warning messages. During normal operation, gauge values are displayed in the operator compartment. During out-of-spec conditions, alarms and warning/instructional messages are also displayed.

In the preferred embodiment, sensed data is directly sampled by sensors 18 of a type well-known in the art for producing electrical signals in response to the level of operational parameters and includes pulse-width modulated sensor data, frequency-based data, five volt analog sensor data, and switch data that has been effectively debounced. The sensors are connected to an electronic module 20 for delivery of the sensor signals.

In the embodiment of FIGS. 1 and 2, the sensor signals are delivered to the electric module 20 by either direct connection of analog sensors, connection by way of an RS485 link, or over a datalink governed by SAE specifications J1587 and J1708. A push-button is also included to trigger the acquisition of a snapshot of data. Connection is also provided from the machine battery and key switch to the electronic module 20.

In the preferred embodiment, the electronic module 20 includes a microprocessor, a lower level communications board (not shown) of a type well-known in the art, and a memory section 24 including high level flash memory and battery backed RAM. The electronic module also includes a pair of RS232 connections, one being available for connection to the satellite communications system 21 and the other being available for connection to an off-board computer 22 used in downloading of data and initialization of the system. In the preferred embodiment, the off-board computer 22 is a laptop personal computer.

To document the performance of the machine and/or its major components, performance baselines are stored in an array within the memory device located in the electronic module 20. These baselines are used during key, repeatable performance checks of the machine to help verify machine/component health and, as discussed below, are used as reference points to determine whether the machine is in an operating condition in which machine parameters are to be processed and stored.

A subset of parameters for which trend data is to be produced is either predefined or defined via the off-board computer 22 or the central computer 16. Each parameter includes a dependency definition that identifies the conditions under which data will be stored for trending purposes. Typically, the dependency definition is selected to indicate the normal operating conditions of the machine; for example, when RPM or boost pressure are above predetermined levels. The trending definition for each parameter may vary and may be a function of several other machine parameters that shall be referred to as dependencies. Trend data is gathered and stored in memory as the specified dependency definition is met over a specified trend period, which is measured either in time, such as over a period of ten hours, or in counts, such as over a period of ten transmission shifts. Trend data is typically only obtained while the engine 13 is running and/or the machine is operating. Based on the specified trend type, the maximum, minimum, or cumulative value of data gathered during this period is then stored as a single trend point with counts to determine the average value and/or the points available. The determination of whether to use the average, maximum, or minimum value to obtain the trend point is based on the system designer's decision regarding which type of calculation would provide the best indication of changes in engine 13 or machine performance or impending failures. It should also be understood that multiple values could be calculated for the same sensed parameter, i.e., trend points could be calculated to indicate both an average value and a minimum value for a designated machine parameter.

Referring now to FIG. 3, one method executed by the processor within the electronic module 20 to perform the above functions is now described. At decision block 26, the electronic module 20 first determines whether the engine 13 or machine is running. Advantageously, the engine 13 is determined to be running if engine 13 speed exceeds cranking engine 13 speed. If the engine 13 or machine is not running, then the method will not proceed. If the engine 13 or machine is running, at block 28, the electronic module 20 reads the sensed machine parameters from the datalink or other inputs.

At decision block 30, for each of the sensed parameters, the electronic module 20 determines whether that parameter is to be processed to provide trend data. If trend data is to be provided, the trending definition is retrieved and the dependency parameters are checked to determine whether the dependency definition is satisfied as shown at decision block 32. The dependency definition for each operating parameter of interest is defined in terms of other sensed machine parameters. For example, the dependency definition for boost pressure may be satisfied only when engine 13 RPM is greater than a low operating speed and less than a high operating speed, when the engine 13 rack setting is greater than a predetermined level, and when the jacket water temperature is greater than a predefined operating temperature. That is, values for boost pressure are only saved and processed for producing trend information when the above conditions are satisfied. In this way, all boost pressure values used to produce the trend data will have been acquired when the engine 13 is in the same general operating condition. It should be understood that the actual ranges, minimums, and maximums used in the dependency definitions are determined empirically to define the operating conditions of interest and will vary from machine to machine and application to application.

As shown at block 34, if the dependency definition is satisfied, the value of the sensed parameter is stored. As shown at blocks 36 and 38, this process is continued until either the time period over which each trend point is to be determined, or a predetermined number of events or counts, is reached. At this point the electronic module 20 calculates and stores the trend point. The time period or number of events is selected in response to the designer's desire for precision, the availability of memory space in the memory device, and the length of time or number of counts required to obtain meaningful trend points. The calculation of the trend point may include accumulating the stored values, selecting the maximum stored value, or selecting the minimum stored value. The calculated trend point is saved and the data array for that parameter is then cleared to allow for the storage of data for calculation of the next trend point for that parameter.

Referring to FIG. 4, the present invention primarily concerns trending machine and component failures and performance problems attributable to machine operation, it thus being desired to eliminate trend points reflecting defects due to manufacturing and assembly from consideration in most instances. Referring to FIG. 4, an illustrative plot 40 of machine failures over time is shown divided into two zones. of the two zones, a first zone A1 shows occurrences of early failures attributable to manufacturing and assembly defects, and a second zone A2 shows operational failures. Zone A2 is the area of concern to the present invention. As would be expected, the occurrence of the failures in zone A2 increases with the hours of operation of the machine. The trend data obtained by way of the above described steps can be processed in a suitable conventional manner to filter out data points relating to manufacturing and assembly defects.

Turning to FIG. 5, a method of the invention for analysis of the trend data for determining the severity of a trend toward an impending failure or point of unacceptable performance will now be discussed. In FIG. 5, a representative curve 42 of trend data units or points verses time for an engine or machine parameter under typical operating conditions is shown. Also shown is a curve 44 of trend data units verses time for the same parameter under actual operating conditions. Curve 42 is essentially a theoretical failure trend curve generated from past actual or historical data points or other information and extends to a predetermined limit line 46 representative of a failure condition or point of unacceptable performance for the engine, machine or component. Although shown as a straight line, here it should be understood that curve 42 could have a more curved shape, depending on the character of the data points collected. Curve 44 can be generated in its entirety, or in part, from data points collected under actual operating conditions.

Here, curve 44 has been generated in part from actual operating condition data points to a time $t_1$, and is projected from time $t_1$ to limit line 46. Curves 42 and 44 can be generated, and the slopes thereof determined, using any suitable conventional techniques, such as the least squares method as disclosed in Schricker et al. U.S. Pat. No. 5,561,610 issued Oct. 1, 1996 to Caterpillar Inc. The time difference between when curves 42 and 44 reach limit line 46 is denoted by $\Delta H$, which represents the extent that the life of the machine, engine or component is shortened under the actual use conditions compared to the typical conditions.

Comparing curves 42 and 44, prior to time $t_1$ curve 44 has a slope which is less than the slope of curve 42, and if projected as a straight line to limit line 46, it would appear that under the actual operating conditions prior to time $t_1$ the machine or component would have a longer life than under the typical or theoretical conditions. However, at time $t_1$ it can be seen that curve 44 increases in slope as denoted by the letter S such that if curve 44 were projected solely based on the value of the slope thereof at this point, it would appear that under the actual conditions the machine or component would have a shorter life compared to the typical life, thus indicating that some factor or factors is or are at work to increase the rate at which the trend approaches failure limit 46.

For example, assuming the trend data units plotted in FIG. 5 represent engine oil temperature, the increase in the slope of curve 44 could be the result of actual operating temperatures greater than those used to compute the typical trend; and/or the machine or engine may be operating under a heavier load; and/or oil coolant lines and/or an oil cooling radiator may be clogged or a cooling fan for the radiator malfunctioning. Other possible factors can include possible abusive operation by an operator; and/or operation over rougher terrain; and/or operation at high altitude or steep grades. All of the above factors may be pertinent to an accurate determination of the expected shortened life of the machine or component, and in determining steps that can be taken to prolong the machine or component life.

These factors can be taken into consideration in a determination of a severity value or measure of the trend, which can be calculated using the following equation:

$$\text{severity} = \frac{(W_2 \times \text{slope value of the actual trend curve})}{(W_1 \times \text{slope value of the typical trend curve})}$$

wherein $W_2$ and $W_1$ equal empirically determined weights to account for the relevant specific application or site factors and environmental effects, i.e., temperature, altitude and terrain, as just discussed. Additionally, $W_1$ and $W_2$ can be determined based in part on other desired factors, such as a factor indicative of the relative time when the severity is computed, i.e. the time from $t_1$ to the limit 46, and/or elapsed time since operation of the machine began or since the last maintenance or service performed on the machine.

Referring to FIGS. 6 and 7, flow diagrams showing the above discussed steps and subsequent steps according to the present invention are provided. In FIG. 6, block 48 represents data collection as discussed in reference to FIGS. 1–3 above. In block 50 the data trend curves are projected as illustrated in FIG. 5. A typical severity profile or parameter is then computed as a function of a plurality of factors, as shown at block 52 in FIGS. 6 and 7. These factors can include, but are not limited to, projected life of the machine or component, design data, environmental data, experimental data and application or site specific data. An overall severity value can then calculated using the equation set forth above, as shown at blocks 54 in FIGS. 6 and 7. Various factors for determining weights $W_1$ and $W_2$ can be used, such as, but not limited to, load, operating temperature, pressure variations, environmental factors, and application or site specific factors, as illustrated in FIG. 7.

As show at block 56 in FIGS. 6 and 7, where severity is variable with time or some other factor or factors, it may be desirable to trend severity over time or with the variation in a pertinent factor or factors. Then, severity for a particular instance in time or under a particular condition can be computed or determined, as shown at block 58 in FIGS. 6 and 7. For example, the slope of the severity trend over a time period $\Delta T$ between a time $T_1$ and a time $T_{-1}$ may provide a suitable severity value and can be calculated using a either of the following equations.

$$\frac{(\text{Severity}_{T1} - \text{Severity}_{T-1})}{\Delta T}$$

$$\frac{\text{Serverity}_{T1} - \text{average of past } N \text{ Severities}}{\Delta T}$$

The calculated severity is then compared to the typical severity profile value previously determined at block 52. If the computed severity is greater than the typical profile, a problem is identified and the severity is associated with the current events or conditions, as shown at block 62. For instance, to use the example from above, if the severity determination relates to oil temperature, other sensor data would be reviewed or a physical check of the machine would be made to determine if related events or conditions are present. For instance, a determination would be made whether the cooling fan was operational or a coolant line or a radiator was clogged, as represented at block 64. At block 66, appropriate personnel would be alerted or other action taken, such as corrective action or some step to alleviate the condition such as moving the machine to an easier job or removing an abusive operator.

Industrial Applicability

The present method and apparatus for determining the severity of a trend toward an impending machine failure and responding to the same has utility for a wide variety of applications, including for use with machines such as over-the-highway trucks and large work machines such as off-highway mining trucks, hydraulic excavators, track type tractors, wheel loaders, and the like where productivity loss and downtime can be significant expenses. Using the present method and apparatus, when a severe trend toward an impending machine failure is determined, appropriate personnel can be notified, such that the machine can be repaired, placed on lighter duty, or other corrective action taken. The present invention also has utility for failure diagnosis and prognosis, and can be used for more accurately determining warranty cost and limitations for applications involving unusual operating conditions.

Other aspects, objects and advantages of the present invention can be obtained from a study of the drawings, the disclosure and the appended claims.

What is claimed is:

1. A method for determining severity of a trend toward an impending machine failure under actual operating conditions, comprising the steps of:
   (a) providing a typical failure trend based on a set of normal operating conditions for the machine;
   (b) providing a trend toward an impending machine failure under actual operating conditions;
   (c) determining a slope value for the typical failure trend;
   (d) determining a slope value for the trend toward the impending machine failure under the actual operating conditions;
   (e) determining a weight value for at least the actual operating conditions; and
   (f) determining the severity as a function of the slope values and the weight value.

2. The method of claim 1, wherein the weight value is determined for the typical failure trend and the severity is determined as a function of the slopes and the weight values for the normal operating conditions and the actual operating conditions.

3. The method of claim 2, wherein the weight value for the normal operating conditions is determined based on data selected from the group consisting of projected life data for the machine, design data for the machine, environmental data, experimental data, application specific data, and combinations thereof.

4. The method of claim 1, wherein the weight value for the actual operating conditions is determined from data selected from the group consisting of load data, temperature data, pressure variation data, environmental data, application data, and combinations thereof.

5. The method of claim 1, wherein the severity is compared to a typical severity value, and if greater, then a signal is outputted for alerting appropriate personnel.

6. The method of claim 1, wherein the severity is compared to a typical value, and if the severity is greater than the typical value, a root cause of the severity is determined as a function of at least the actual operating conditions.

7. The method of claim 1, wherein the severity is determined as a function of a severity trend.

8. The method of claim 1, wherein the determined severity is compared to a predetermined typical severity profile value, and, if greater than the typical profile, a problem is identified and the severity associated with current events or conditions to determine a root cause for the severity.

9. Apparatus for determining severity of a trend toward an impending machine failure under actual operating conditions, comprising:
   (a) a stored typical failure trend based on a set of normal operating conditions for the machine; and
   (b) a processor operable for:
      (i) determining a slope value for the typical failure trend;
      (ii) determining a trend toward an impending machine failure under actual operating conditions;
      (iii) determining a slope value for the trend toward the impending machine failure under the actual operating conditions;
      (iv) determining a weight value for at least the actual operating conditions; and
      (v) determining the severity as a function of the slope values and the weight value.

10. Apparatus of claim 9, wherein the weight value is determined for the typical failure trend and the processor determines the severity as a function of the slopes and the weight values for the normal operating conditions and the actual operating conditions.

11. Apparatus of claim 9, wherein the weight value for the actual operating conditions is determined from data selected from the group consisting of load data, temperature data, pressure variation data, environmental data, application data, and combinations thereof.

12. Apparatus of claim 11, further comprising at least one sensor for sensing one of the operating conditions connected to the processor for providing data representative of the sensed operating condition thereto.

* * * * *